United States Patent [19]

Pugh

[11] 4,038,137

[45] July 26, 1977

[54] LOCKING MEANS FOR FUEL BUNDLES

[75] Inventor: Ralph A. Pugh, Richland, Wash.

[73] Assignee: Exxon Nuclear Company, Inc., Bellevue, Wash.

[21] Appl. No.: 628,545

[22] Filed: Nov. 3, 1975

Related U.S. Application Data

[63] Continuation of Ser. No. 400,734, Sept. 26, 1973, abandoned, which is a continuation of Ser. No. 273,161, July 19, 1972, abandoned.

[51] Int. Cl.$^2$ .............................................. G21C 3/32
[52] U.S. Cl. ................................................... 176/78
[58] Field of Search ............... 176/76, 78; 151/41.71, 151/62, 5; 238/252

[56] References Cited

U.S. PATENT DOCUMENTS

| | | | |
|---|---|---|---|
| 1,077,770 | 11/1913 | Wade | 151/62 |
| 1,411,163 | 3/1922 | Collins | 238/252 |
| 3,382,153 | 5/1968 | Bigge et al. | 176/78 |
| 3,431,170 | 3/1969 | Lass et al. | 176/78 |
| 3,697,376 | 10/1972 | Mefford et al. | 176/78 |
| 3,775,249 | 11/1973 | Clapham | 176/78 |

*Primary Examiner*—Harvey E. Behrend
*Attorney, Agent, or Firm*—Ronald D. Hantman

[57] ABSTRACT

A nuclear power reactor fuel bundle having a plurality of fuel rods disposed between two end plates positioned by tie rods extending therebetween. The assembled bundle is secured by one or more locking forks which pass through slots in the tie rod ends. Springs mounted on the fuel rods and tie rods are compressed by assembling the bundle and forcing one end plate against the locking fork to maintain the fuel rods and tie rods in position between the end plates. Downward pressure on the end plate permits removal of the locking fork so that the end plates may be removed, thus giving access to the fuel rods. This construction facilitates disassembly of an irradiated fuel bundle under water.

6 Claims, 3 Drawing Figures

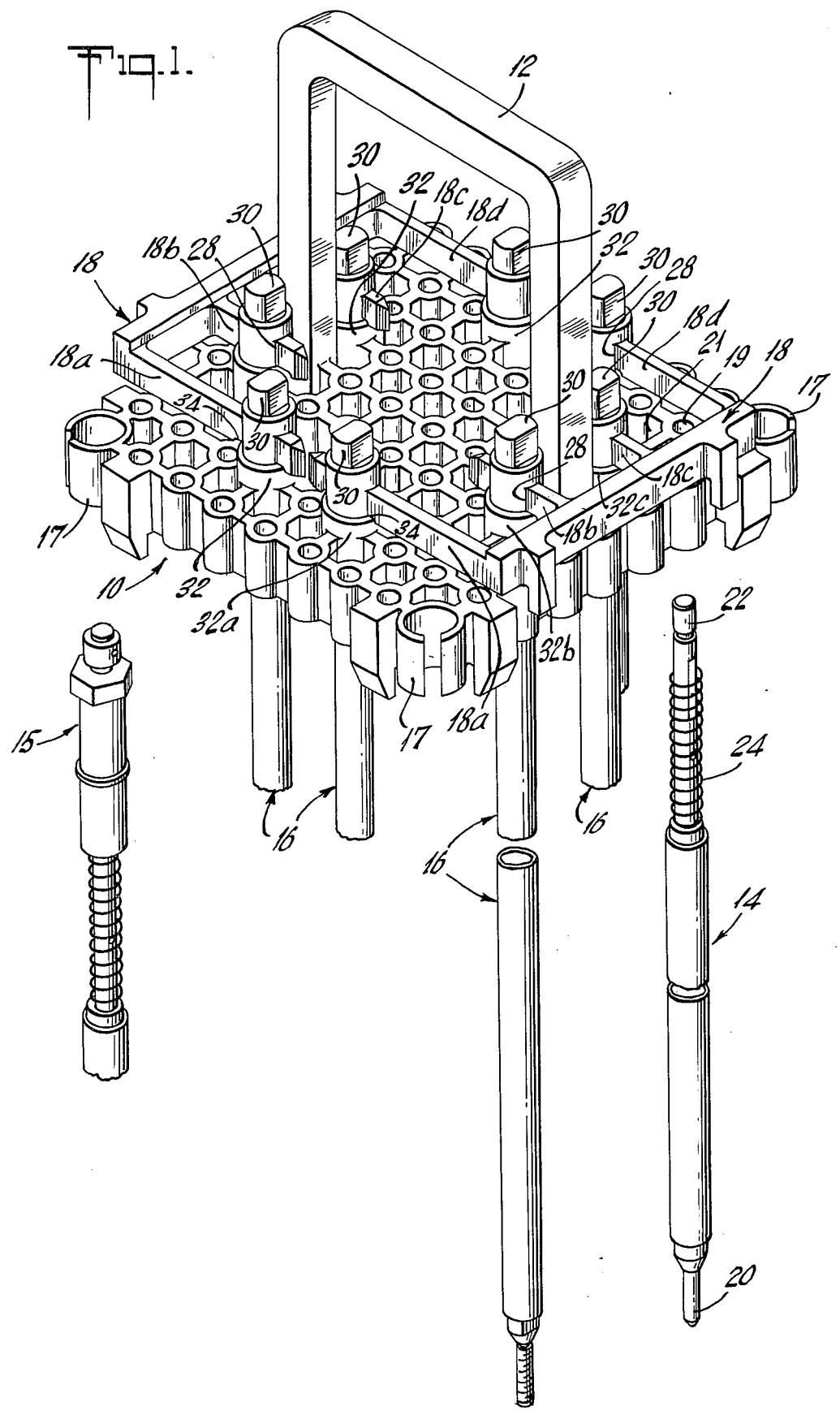

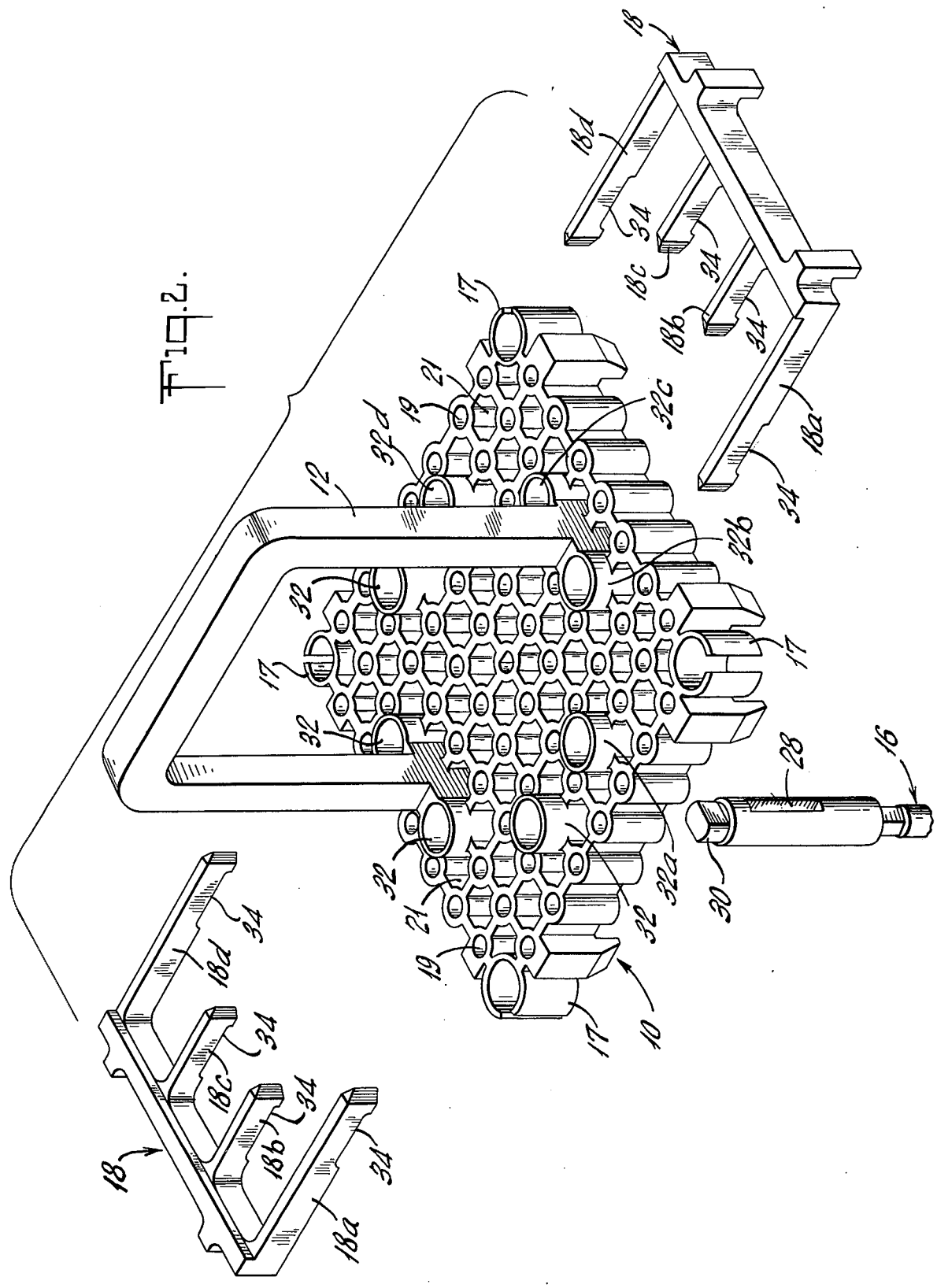

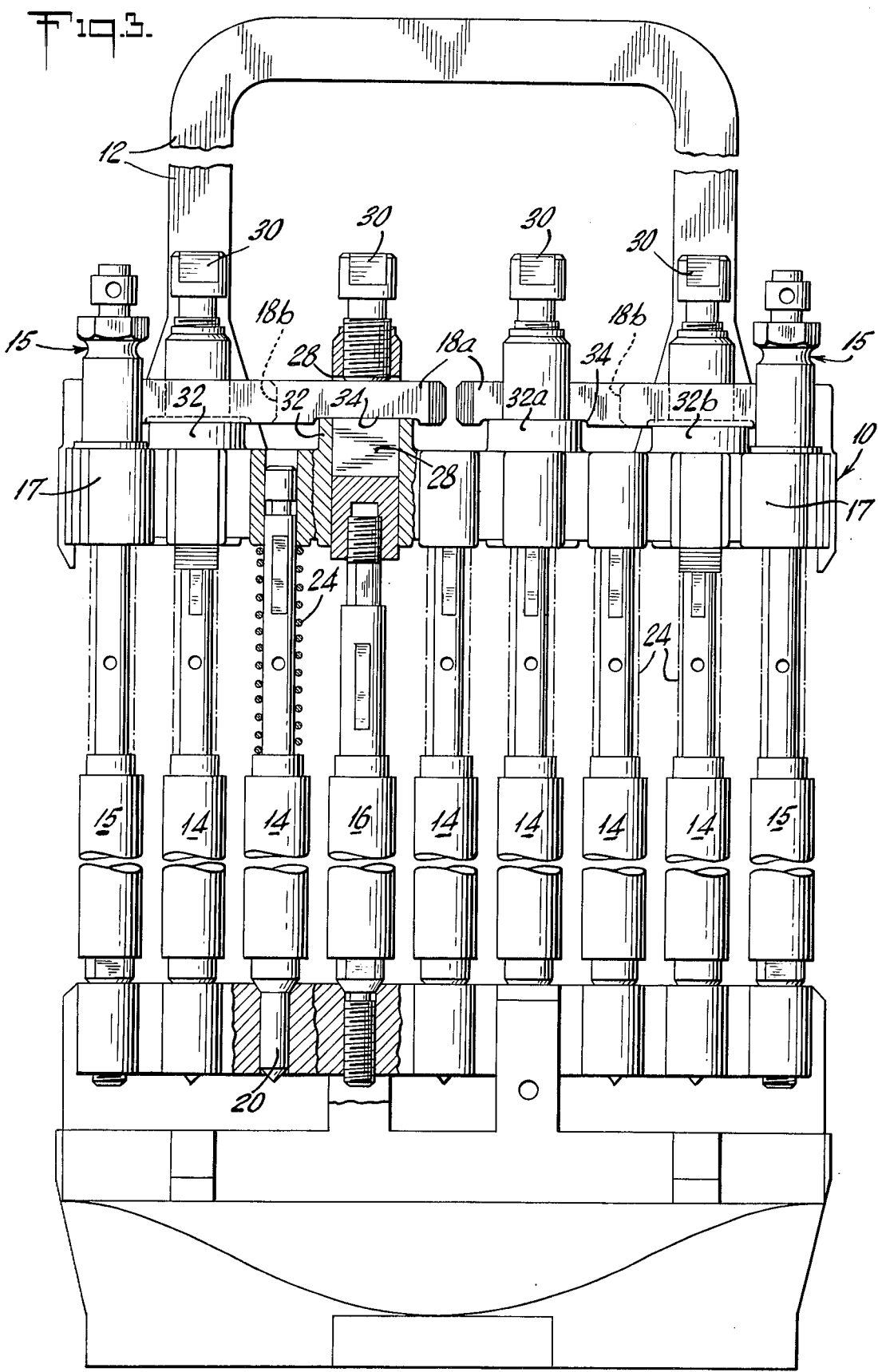

LOCKING MEANS FOR FUEL BUNDLES

BACKGROUND OF THE INVENTION

The present invention relates to nuclear power reactor fuel bundles. More particularly, it discloses a novel and improved method and apparatus for assembling a fuel bundle for use with such nuclear power reactors.

The production of power from nuclear fission may be accomplished in several ways. A commonly used commercial apparatus uses a boiling water reactor. In such reactors, the heat generated by nuclear fission is removed by the boiling of water. The steam produced is sent to a turbine which drives an elecrical generator. After passing through the turbine and thereafter being condensed, the water is recycled to the reactor where it is boiled again. While such a cycle is analogous to conventional steam boiler plants in its broadest aspects, there are many problems unique to the operation in which heat is supplied by nuclear fission.

In boiling water reactors, the fission occurs within so-called fuel rods which are assembled into bundles, a multiplicity of which are located in the fuel core of the reactor. Water surrounds each bundle and passes upward between the fuel rods as heat is received from the nuclear fission reaction.

As the reactor operates, the fuel is gradually consumed and it is necessary at periodic intervals to replace the fuel by replacing the fuel bundles. In order to operate the reactor under optimum conditions, usually only a fraction of the fuel bundles are replaced at any one time. If there is a failure of the bundles which permits radioactive materials to enter the water stream the fuel bundles must be repaired. Because of the presence of radioactivity these bundles must be disassembled and repaired by remote control. Thus the fuel bundles should be as mechanically simple as possible an be readily adaptable for remote disassembly.

In the prior art as typified by U.S. Pat. No. 3,431,170 it has been common for fuel bundles to be assembled from groups of fuel rods spaced and suspended between end plates which act to fix the fuel rods in position relative to each other. In order to minimize expansion difficulties under the high temperatures at which the nuclear reaction occurs and at the same time to minimize the disassembly problem, fuel rods commonly float between the end plates. The rods have a projection at one end which fits into a corresponding hole in one end plate. There is a similar arrangement at the other end plate with the exception that around the rod there is placed a spring which is compressed when the bundle is assembled. Tie rods are employed to hold the assembled end plates together. These tie rods have commonly been threaded at one end so as to be securely fastened into the first end plate. The other end of the tie rod passes through an opening in the second end plate and is secured by a nut bearing on the second end plate. Locking devices such as discussed in the above-referenced patent have been used to prevent the nuts from loosening in service. As will be appreciated, the use of a nut and bolt inherently complicates the disassembling process. Therefore, it is an object of the present invention to provide an alternate means for assembling nuclear fuel bundles which does not involve the use of nuts and bolts and simplifies disassmbly by remote control.

Other objects of the invention will be made evident within the description of the invention which follows:

SUMMARY OF THE INVENTION

An improved fuel bundle assembly for nuclear power reactors employing locking forks which pass through slots in the tie rods to hold the end plates in position against the spring tension. Fuel rods float between the end plates and are held in position by a spring mounted on each rod. The tie rods at one end are threaded into one end plate and at the other end pass through the second end plate and are secured by means of locking forks which pass through longitudinal slots found in the ends of each tie rod. The spring tension supplied by the fuel rods presses the end plate upward into abutting relation with the locking forks. Pressing downwardly on the upper end plate exposes the slots in the tie rods and permits disengagement of the locking forks from the tie rods. Thereafter, the end plate may be removed, giving access to the individual fuel rods.

BRIEF DESCRIPTION OF THE DRAWINGS

FIG. 1 shows a perspective view of the essential elements of a nuclear fuel bundle assembled according to the present invention.

FIG. 2 is an exploded perspective view of a portion of FIG. 1 illustrating the present invention in more detail.

FIG. 3 represents an elevation of the fuel bundle of FIG. 1 assembled according to the present invention cut away in part to illustrate the assembly of the rods with the end plates.

DESCRIPTION OF THE PREFERRED EMBODIMENT

FIG. 1 illustrates the present invention embodied in a standard fuel bundle (partially shown). The bundle comprises a plurality of rods 14 continuing nuclear fission fuel located between two end plates, only one of which is shown and designated as 10. The upper end plate 10 typically is a casting containing a plurality of opening therethrough. Some of the openings 19 accommodate the ends of the fuel rods 14. Other openings 21 provide pasageways for boiling water which receives heat from the fuel rods when the reactor is operating. The upper end plate 10 has a U-shaped handle 12 affixed to it to facilitate assembly or disassembly of the bundle. Fuel rods 14 pass into openings 19 in the upper end plate 10 and may slide freely therein to accommodate thermal expansion during operation. In a typical fuel bundle all the openings 19 have fuel rods 14 disposed therein. The fuel rods rest in corresponding openings in the lower end plate (not shown) where the end pin 20 is placed within the opening but is not secured in place. A spring 24 surrounding the upper portion of the rod 14 places a force against the upper and lower end plates tending to urge the plates away from each other when the fuel rod is assembled as shown in FIG. 3. At each corner of the fuel bundle there may be provided a target rod 15, shown disassembled from the end plate in FIG. 1. The target rods, used for production of commercial radio isotopes, are not related to the invention and will not be discussed in any detail.

The locking feature of the present invention is related to the tie rods shown generally as 16. These rods are assembled into the lower end plate (not shown) by the threaded portion 26 and thus are prevented from movement in contradistinction to the fuel rod 14. At their upper end, each tie rod 16 passes through an opening formed in a raised boss 32 provided in the upper end plate 10. As will be seen in the other views, the tie rod 16 contains a longitudinal slot 28 which extends partially above the boss 32. Each fuel bundle typically contains eight or twelve of these tie rods 16. After passing through the upper end plate 10 and exposing a portion of the slots, the tie rods 16 are locked in place by insertion of locking forks 18. In the preferred embodiment shown, two locking forks are used, each engaging four of the tie rods. The upper end plate is under an upward force exerted by a multiplicity of the springs 24, and is restrained from movement by the locking forks 18. The forks 18 provide an effective abutment for the end plate 10 and lock the rods 16 in place. It will be apparent that if a downward force is exerted on the handle 12, the end plate 10 is urged downward which relieves the locking pressure of the springs and permits withdrawal of the locking forks 18 from the slot 28. The end plate 10 can then be removed. Once the upper end plate has been removed, it is possible for the fuel rods to be removed easily since they only rest in the openings in the end plates and are not secured in place by a mechanical connection.

FIG. 2 shows an exploded view of the essential elements of FIG. 1. It can be seen that the upper end of a typical tie rod 16 contains a longitudinal slot 28 machined through it. A set screw 30 at the upper end of the tie rod 16 extends into the slot 28 to adjust the amount of the slot which is open and thereby controls the effective length of each tie rod. As shown in FIG. 2, the tie rod 16 extends through the raised boss 32 in the upper end plate 10, exposing a portion of the slot 28. The locking fork 18 may be moved inwardly so that tines 18a—d will engage the corresponding slot 28 in each of the tie rods. While the bundle is being assembled, a downward force is exerted on the handle 12 to expose a sufficient portion of the slot opening 28 to permit the locking forks to pass therethrough. The ends of the tines 18 are pointed to facilitate initial engagement with the slots. The tines 18 pass through the slots until the recessed area 34 formed on the underside of each tine rests over the slot walls, whereupon the downward pressure on the handle 12 may be released. The compressed fuel rod springs 24 will force the end plate 10 in the upward direction until it comes into abutting relation with the locking forks 18. As previously mentioned, the procedure is reversed when disassembly of the fuel bundle is required. It can be seen that the present invention makes possible much easier disassembly and assembly of the fuel bundle inasmuch as bolts or other such positive mechanical locking devices need not be removed from each tie rod. The invention greatly facilitates the disassembly of the bundles by remote control after the bundles have been exposed to the nuclear reactor and have become radioactive. FIG. 3 shows an elevation view of a section of the fuel bundle in its assembled form, clearly showing the relationship of the various part in an assembled fuel bundle. Both the upper end plate 10 previously described and the lower end plate 36 are illustrated. Extending between the two end plates are three types of rods. The largest number are fuel rods and are shown generally as 14. These rods engage holes in the upper and lower end plates and are not rigidly attached to either plate. The fuel rods 14 are held against the lower end plate 36 and force is exerted against the upper end plate 10 by the springs 24. Each rod may be easily removed once the upper end plate 10 has been withdrawn. Two of the four target rods 15 are shown in FIG. 3. The tie rods 16, of which 4 are visible in this view, are shown threaded into the lower end plate 36 and thereby secured in position in contradistinction to fuel rods 14. The upper end of each tie rod 16 passes through the upper end plate 10. Slot 28 will be seen to be longer than is exposed above boss 32. If upper end plate 10 is moved in a downward direction against the spring pressure, the slots 28 are exposed, making it possible to remove the locking forks 18, which are shown fully engaged with the rods 16. The locking forks stop further upward movement of the end plate 10 under the urging of springs 24. The force of the springs is taken up by the lower end plate 36 through tie rods 16. When the locking forks 18 are fully assembled, the locking forks 18 are engaged at the recess 34 of each tine 18, creating a slight overhang which will resist the withdrawal of the locking forks by catching on boss 32. When the handle 12 is depressed sufficient slot area is exposed to make it possible to withdraw the locking forks. In this way the vibration which is encountered during operation will not dislodge the locking forks causing premature disassembly of the fuel bundle.

It will be understood that while the preferred embodiment shown herein is illustrative of a satisfactory means of accomplishing the objectives of this invention, that modification of the various details are possible without departing from the true spirit and scope of this invention which is defined in the appended claims.

What is claimed is:

1. In a nuclear power reactor fuel bundle having tie rods for securing a pair for fuel rod mounting end plates in assembled position against the force exerted by compressed springs operably associated with said fuel rods and urging at least one of said end plates away from the other of said end plates, the improvement which comprises:
   a. an elongated slot near an end of each of said tie rods, said slot having an upper end spaced from said end of said tie rod, said slot extending at least partially beyond said one of said end plates when said end plates are in assembled position; and
   b. a fork-shaped member having a plurality of parallel tines which maintain said end plates in assembled position, each of said tines extending through a corresponding one of said slots in parallel relation, said compressed springs urging said end plate into abutting engagement with said tines of said fork-shaped member so that said tines of said fork-shaped member are forced against said upper end of said slots.

2. In a nuclear power reactor fuel bundle having tie rods for securing a pair of fuel rod mounting end plates in assembled position against the force exerted by compressed springs operably associated with said fuel rods and urging at least one of said end plates away from the other of said end plates wherein said end plates include openings for receiving said tie rods and said fuel rods, the improvement which comprises:
   a. an elongated slot near an end of each of said tie rods, said slot having an upper end spaced from said end of said tie rods, said slot extending at least partially beyond said one of said end plates when said end plates are in assembled position;
   b. locking means operatively engaging said elongated tie rod slots and preventing movement of said one end plate in opposition to force exerted by said compressed springs for securing said one end plate in locked engagement with said tie rods and against separation from said bundle, said locking means comprising a fork-shaped member having a plurality of parallel tines, each of said tines extending through a corresponding one of said slots; and c. raised boss means associated with each of said openings in said one end plate through which said tie rods extend, said boss means disposed on the side of said one end plate opposite from said other of said end plates, said slots in said tie rods extending partially above the corresponding one of said boss means, each of said tines including a recess located on the underside thereof for abutting engagement with the corresponding one of said raised boss means so that said tines of said fork-shaped member are forced against said upper end of said slots 3. In a nuclear power reactor fuel bundle having tie rods for securing a pair of fuel rod mounting end plates in assembled position against the force exerted by compressed springs operably associated with said fuel rods and urging at least one of said end plates away from the other of said end plates wherein said end plates include openings for receiving said tie rods and said fuel rods, the improvement which comprises:

a. an elongated slot near an end of each of said tie rods, said slot having an upper end spaced from said end of said tie rods, said slot extending at least partially beyond said one of said end plates when said end plates are in assembled position; and b. locking means operatively engaging said elongated tie rod slots and preventing movement of said one end plate in opposition to force exerted by said compressed springs for securing said one end plate in locking engagement with said tie rods and against separation from said bundle, said locking means comprising a fork-shaped member having a plurality of parallel first and second tines, said first tines being disposed parallel to said second tines at the extremities of said locking fork and being longer than said second tines said tines being disposed internally of said first tines, each of said first and second tines extending through a corresponding one of said slots of said tie rods extending through said openings.

4. The fuel bundle of claim 3 wherein the extremity of each of said tines is pointed for facilitating initial engagement with said slots.

5. The fuel bundle of claim 4 wherein said tie rods are fixed at one end in said other end plate and include adjustable means at the other end thereof for varying the length of said slot.

6. The fuel bundle of claim 5 wherein said adjustable means comprises set screws which enter said slots for adjusting the slot length.

* * * * *